United States Patent [19]

Obitsu et al.

[11] Patent Number: 5,248,463
[45] Date of Patent: Sep. 28, 1993

[54] PREPARATION OF ZIRCONIA SINTERED BODY

[75] Inventors: Masamichi Obitsu; Makoto Yoshinari, both of Tokyo; Yutaka Kimura, Funabashi, all of Japan

[73] Assignee: Nissan Chemical Industries, Ltd., Tokyo, Japan

[21] Appl. No.: 928,762

[22] Filed: Aug. 17, 1992

Related U.S. Application Data

[63] Continuation of Ser. No. 588,180, Sep. 26, 1990, abandoned.

[30] Foreign Application Priority Data

Sep. 29, 1989 [JP] Japan ................ 1-254101

[51] Int. Cl.$^5$ .............................................. C04B 35/48
[52] U.S. Cl. ..................................... 264/63; 264/328.2; 501/103
[58] Field of Search ................ 264/63, 328.2; 501/103

[56] References Cited

U.S. PATENT DOCUMENTS 4,713,206 12/1987 Matsuhisa et al. ............... 264/328.2
4,873,064 10/1989 Kato et al. ...................... 501/103

FOREIGN PATENT DOCUMENTS 0094731 11/1983 European Pat. Off.
0194556  9/1986 European Pat. Off.
0246438 11/1987 European Pat. Off.
0262579  6/1988 European Pat. Off.
0314939  5/1989 European Pat. Off.
6143286 11/1981 Japan.
61-97134  5/1986 Japan.
63-185821 8/1988 Japan.

*Primary Examiner*—James Derrington
*Attorney, Agent, or Firm*—Birch, Stewart, Kolasch & Birch

[57] ABSTRACT

Zirconia sintered bodies are produced by injection molding a zirconia composition comprising zirconia powder and an organic binder and firing the molded composition. High density sintered bodies having strength, white transparency and smoothness are obtained when zirconia powder containing 2 to 10 mol % of yttria in solid solution form and having a specific surface area of up to 12 $m^2/g$ as measured by the BET method and a product of average particle size by specific surface area of up to 3 $\mu m \cdot m^2/g$ is used.

17 Claims, No Drawings

PREPARATION OF ZIRCONIA SINTERED BODY

This application is a continuation of application Ser. No. 07/588,180, filed on Sep. 26, 1990, now abandoned.

This invention relates to preparation of zirconia sintered bodies, and more particularly, to a method for preparing sintered zirconia by injection molding a zirconia composition followed by firing and the resultant zirconia sintered bodies.

BACKGROUND OF THE INVENTION

Injection molding is one of well-known techniques for the preparation of sintered zirconia. More particularly, sintered zirconia is prepared by blending zirconia powder with an organic binder to form a molding composition and injecting the composition into a mold to form a green body of predetermined shape, followed by binder removal and firing. A key in this method is to impart appropriate fluidity to the molding composition in order to fill the mold cavity with the composition by injection. It is also important that the green body have a sufficient green strength to release from the mold, that is, the green body be self-sustaining.

Therefore, the organic binders should be easily burned off and impart fluidity and self-sustaining property to such ceramic molding compositions containing zirconia powder. Such commonly used organic binders are given below.

(a) hydrocarbon waxes such as paraffin wax
(b) plasticizers including phthalates such as dioctyl phthalate, dibutyl phthalate, diethyl phthalate, etc. and adipates such as dioctyl adipate, dibutyl adipate, etc.
(c) deflocculants such as aliphatic amines
(d) dispersants such as cationic, anionic and nonionic surface active agents
(e) oils such as mineral oil, tung oil, and coconut oil
(f) low molecular weight compounds such as fatty acids fatty acid esters, and alkyl alcohols
(g) thermoplastic resins such as polyacrylic resin, polystyrene, polypropylene, polyethylene, polyamide, and ethylene-vinyl acetate copolymers However, in preparing molding compositions by adding these organic binders to zirconia powder and blending the mixture, it is very difficult to find a compromise among fluidity, self-sustaining and binder removal parameters. More particularly, if the molding composition is well self-sustaining, then it suffers from fluidity and binder removal problems. If the molding composition is well flowing, then it suffers from binder removal and self-sustaining problems. The compatible composition of the binder substantially varies with the identity of zirconia powder.

Although the prior art injection molding zirconia compositions were intended to improve their fluidity, self-sustaining and binder removal properties in harmony as described above, with the use of conventional zirconia powder, it was very difficult to find a balanced profile of fluidity, self-sustaining and binder removal properties. No satisfactory sintered zirconia bodies were manufactured.

SUMMARY OF THE INVENTION

Therefore, a primary object of the present invention is to provide a method for preparing a high density zirconia sintered body having improved strength, white transparency and smoothness by using a zirconia composition which exhibits a good profile of fluidity, self-sustaining and binder removal properties even with a small amount of organic binder and firing the composition. Another object of the present invention is to provide the zirconia sintered body prepared by the method.

Searching for the zirconia powder which allows a molding composition to exhibit a good profile of fluidity, self-sustaining and binder removal properties and to be injection molded with ease, the inventors have found that the above and other objects are attained with the use of a zirconia powder containing 2 to 10 mol% of yttria in solid solution form and having a specific surface area of up to 12 $m^2/g$ as measured by the BET method and an average particle size multiplied by the specific surface area of up to 3 $\mu m \cdot m^2/g$.

The present invention provides a method for preparing a zirconia sintered body comprising the steps of injection molding a zirconia composition comprising zirconia powder and an organic binder, said zirconia powder containing 2 to 10 mol % of yttria in solid solution form and having a specific surface area of up to 12 $m^2/g$ as measured by the BET method and a product of an average particle size by the specific surface area of up to 3 $\mu m \cdot m^2/g$, and firing the molded composition into a sintered body. The zirconia sintered body produced by the method to a density of at least 6.0 $g/cm^3$ is also included in the present invention.

DETAILED DESCRIPTION OF THE INVENTION

According to the present method, a zirconia sintered body is produced by forming a zirconia molding composition comprising zirconia powder and an organic binder, injection molding the composition into a green body, and firing the green body.

The zirconia powder used herein is first discussed. In general, zirconia powder having a larger average particle size cannot be fired into a dense sintered body due to poor sintering properties. In this sense, a smaller average particle size is preferred, but a certain upper limit exists with specific surface area. Zirconia powder having a specific surface area of more than 12 $m^2/g$ as measured by the BET method requires an undesirably larger amount of organic binder, resulting in a composition which undergoes substantial shrinkage deformation after firing.

With respect to particle shape, particles tangle and interfere with each other to a more extent to lower fluidity as they depart from sphere and more agglomerate into clusters. Acute particles will increase wear damages in the interior of a milling machine, introducing more contaminants in the composition. Therefore, particles are desired to be as spherical as possible.

Therefore, the zirconia powder best suited for injection molding should have an optimum profile of BET specific surface area, average particle size, and particle shape.

We have found that a product of average particle size multiplied by specific surface area is a suitable parameter representing the optimum profile. The zirconia powder best suited for injection molding should have a specific surface area of up to 12 $m^2/g$ and a product of average particle size by specific surface area of up to 3 $\mu m \cdot m^2/g$. The specific surface area is measured by the BET method and the average particle size is measured by the centrifugal sedimentation method. Assuming that zirconia particles have a true spherical shape, the product of average particle size by specific surface area is approximately 1 μm·m²/g. Differently stated, as the product of average particle size by specific surface area approaches to 1 μm·m²/g, the particle shape approaches to the true sphere and agglomeration is minimized. The product is preferably 3 μm·m²/g or lower.

Preferably, the average particle size ranges from 0.05 to 0.5 μm, more preferably from 0.1 to 0.4 μm. Also preferably, the specific surface area ranges from 3 to 12 m²/g, more preferably from 5 to 10 m²/g, as measured by the BET method. The product of average particle size by specific surface area preferably ranges from 1 to 3 μm·m²/g, more preferably from 1 to 2.5 μm·m²/g.

In addition, the zirconia powder should contain 2 to 10 mol %, preferably 2 to 8 mol % of yttria in solid solution form. If the content of yttria in solid solution form is less than 2 mol %, there occur problems including a lowering of strength and irregular thermal expansion. If the content of yttria in solid solution form is more than 10 mol %, there occur problems including reduced strength and a loss of solid electrolyte performance associated with a lowering of electric conductivity at high temperatures.

These zirconia powders can be produced by the methods of Japanese Patent Publication No. 43286/1986, and Japanese Patent Application Kokai No. 185821/1988, and Japanese Patent Application Kokai No. 97134/1986 or U.S. Pat. No. 4,873,064, for example.

The organic binder used herein may be selected from those commonly used in injection molding of ceramics. Examples include
(a) hydrocarbon waxes such as paraffin wax,
(b) plasticizers including phthalates such as dioctyl phthalate, dibutyl phthalate, diethyl phthalate, etc. and adipates such as dioctyl adipate, dibutyl adipate, etc.,
(c) deflocculants such as aliphatic amines,
(d) dispersants such as cationic, anionic and nonionic surface active agents,
(e) oils such as mineral oil, tung oil, and coconut oil,
(f) low molecular weight compounds such as fatty acids, fatty acid esters, and alkyl alcohols, and
(g) thermoplastic resins such as polyacrylic resin, polystyrene, polypropylene, polyethylene, polyamide, and ethylene-vinyl acetate copolymers.

Preferred among these are polyacrylic binders, polyamide binders, wax binders, polyolefin binders, polyvinyl acetate binders, and mixtures thereof.

The organic binder is added in an amount of 5 to 30 parts by weight, more preferably 10 to 20 parts by weight per 100 parts by weight of the zirconia powder.

The zirconia powder and the organic binder may be kneaded by conventional milling methods, preferably using a pressure kneader at 90° to 180° C. for 30 minutes to 5 hours. A zirconia composition is prepared by blending the zirconia powder and organic binder so as to provide a constant Brabender equilibrium torque.

If desired, the zirconia composition may contain any other additives, for example, silane coupling agents, titanate coupling agents, sintering aids such as clay, silica, alumina, and titania, and coloring agents such as transition metal compounds and rare earth metal compounds.

The zirconia composition is pelletized in a conventional manner and injection molded into a green body of a desired shape. Injection molding may be carried out by any well-known methods using any well-known injection molding machines. The mold may also be selected from well-known injection molds. The injection molding conditions, which vary with the shape of mold cavity, molding machine capacity and the like, include an injection pressure of 100 to 2,600 kg/cm², an injection speed of 0.1 to 10 cm/sec., a mold temperature of 10° to 70° C., and a cylinder temperature of 100° to 180° C.

After removal from the mold, the green body thus injection molded is removed of the binder and finally fired. Binder removal is carried out typically by heating the green body from the ambient temperature to about 500° C. at a rate of 5°–150° C./hour, preferably 10°–50° C./hour to remove the organic binder through pyrolysis. The atmosphere in which the green body is heated for burning off the binder is usually air although an inert atmosphere such as helium and argon as well as a nitrogen atmosphere, either atmospheric or pressurized, may also be used. The heating time for burning off, which varies with the type of binder, generally ranges from 5 to 100 hours, preferably from 10 to 40 hours.

Finally, the body is fired into a zirconia sintered body preferably at a temperature of 1,300° to 1,600° C., more preferably from 1,350° to 1,500° C. for 0.2 to 10 hours, more preferably 1 to 4 hours. The firing atmosphere may be air although an inert atmosphere of He, Ar, nitrogen or the like may also be used.

The resulting zirconia sintered bodies have the following benefits. Since the amount of binder added is relatively small, the linear shrinkage upon firing from an injection molded or green body into a sintered body is low. This removes some restrictions from the mold design and enables injection molding of complex shape bodies. Although the most serious problem associated with injection molding of conventional zirconia compositions is a long time to burn off the binder, the reduced amount of binder added can be burned off within a shorter time. The manufacturing cost is reduced by a reduction of binder amount.

The sintered bodies resulting from binder removal and firing have a dense structure because of the reduced amount of binder, a higher dimensional accuracy because of reduced linear shrinkage upon firing, and a high density of at least 6.0 g/cm³ approaching to the theoretical density. The sintered bodies have white transparency, surface smoothness, and luster.

EXAMPLE

Examples of the present invention are given below by way of illustration and not by way of limitation.

EXAMPLE 1

To 100 parts by weight of zirconia powder having an average particle size of 0.2 μm as measured by the centrifugal sedimentation method, a specific surface area of 9 m²/g as measured by the BET method, and a product of average particle size by specific surface area of 1.8 μm·m²/g (prepared by the method disclosed in Japanese Patent Application Kokai No. 185821/1988) was added 18 parts by weight of an organic binder in the form of Seramo IB-27 polyacrylic binder (trade name of a mixture of acrylic resin, ethylene-vinyl acetate copolymer, paraffin, and dibutyl phthalate, available from Daiichi Kogyo Seiyaku K.K.). The mixture was milled in a pressure kneader at 150° C. for one hour, obtaining an injection molding composition. The Brabender equilibrium torque during kneading was 1300 g-m. The composition was extruded and cut into pellets through a pelletizer. The composition was then injection molded into a test piece of 5×5×60 mm long, removed of the binder, and fired under the following conditions.

Molding conditions

Injection pressure: 790 kg/cm$^2$
Injection speed: 3 cm/sec.
Mold temperature: 30° C.
Cylinder temperature: 160° C.

Binder removal conditions

Temperature range: 20° to 500° C.
Heating rate: 10°-20 ° C./hour
Binder removal time: 24 hours Firing Conditions Air, 1500° C., 2 hours The resulting sintered body appeared white and had excellent surface smoothness, luster and transparency. It had a high density of 6.09 g/cm$^3$ which is close to the theoretical density and a linear shrinkage of 23.3%.

COMPARATIVE EXAMPLE 1

Zirconia powder having an average particle size of 0.55 μm as measured by the centrifugal sedimentation method, a specific surface area of 6 m$^2$/g as measured by the BET method, and a product of average particle size by specific surface area of 3.3 μm·m$^2$/g was used. A molding composition was prepared by adding the same organic binder as in Example 1 to the zirconia powder and milling the mixture in a pressure kneader at 150° C. for one hour. The binder was added so as to provide the same Brabender kneading equilibrium torque (1300 g-m) as in Example 1. That is, 20 parts by weight of the organic binder was added to 100 parts by weight of the zirconia powder. The amount of binder added was larger than in Example 1. The injection molding composition was pelletized, injection molded, removed of the binder, and fired under the same conditions as in Example 1 except for binder removal conditions.

Binder removal conditions

Temperature range: 20° to 500° C.
Heating rate: 10°-20° C./hour
Binder removal time: 30 hours The resulting sintered body appeared pale brown and had inferior surface smoothness, luster and transparency to the body of Example 1. It had a density of 6.04 g/cm$^3$ and a linear shrinkage of 23.7%. Coloring was attributable to iron values which were scraped from the kneader interior wall during milling of the zirconia powder/binder mixture and left in the mixture.

EXAMPLE 2

The procedure of Example 1 was repeated except that the organic binder was replaced by a polyamide binder, Sunmide PW-B (trade name, available from Sanwa Kagaku K.K.). The amount of the organic binder used to provide the same Brabender kneading equilibrium torque as in Example 1 was 17 parts by weight per 100 parts by weight of the zirconia powder.

The injection molding composition was pelletized, injection molded, removed of the binder, and fired under the same conditions as in Example 1 except for binder removal conditions.

Binder removal conditions

Temperature range: 20° to 500° C.
Heating rate: 5°-10° C./hour
Binder removal time: 80 hours The resulting sintered body appeared white and had excellent surface smoothness, luster and transparency. It had a high density of 6.09 g/cm$^3$ which is close to the theoretical density and a linear shrinkage of 21.1%.

COMPARATIVE EXAMPLE 2

The procedure of Example 1 was repeated except that the zirconia powder in Comparative Example 1 and the organic binder in Example 2 were used. The binder was added so as to provide the same Brabender kneading equilibrium torque (1300 g-m) as in Example 1. That is, 19 parts by weight of the organic binder was added to 100 parts by weight of the zirconia powder. The amount of binder added was larger than in Example 2. The injection molding composition was pelletized, injection molded, removed of the binder, and fired under the same conditions as in Example 2 except for binder removal conditions.

Binder removal conditions

Temperature range: 20° to 500° C.
Heating rate: 5°-10° C./hour
Binder removal time: 90 hours The resulting sintered body appeared white and had inferior surface smoothness, luster and transparency to the body of Example 2. It had a density of 6.05 g/cm$^3$ and a linear shrinkage of 22.2%.

COMPARATIVE EXAMPLE 3

Zirconia powder having an average particle size of 0.24 μm as measured by the centrifugal sedimentation method, a specific surface area of 17.4 m$^2$/g as measured by the BET method, and a product of average particle size by specific surface area of 4.18 μm·m$^2$/g was used. A molding composition was prepared as in Example 1 by adding the same organic binder as in Example 1 to the zirconia powder and milling the mixture in a pressure kneader at 150° C. for one hour. The binder was added so as to provide the same Brabender kneading equilibrium torque (1300 g-m) as in Example 1. That is, 23 parts by weight of the organic binder was added to 100 parts by weight of the zirconia powder. The amount of binder added was markedly larger than in Example 1. The injection molding composition was pelletized, injection molded, removed of the binder, and fired under the same conditions as in Example 1 except for binder removal conditions.

Binder removal conditions

Temperature range: 20° to 500° C.
Heating rate: 10°-20° C./hour
Binder removal time: 40 hours The resulting sintered body appeared white and had inferior surface smoothness, luster and transparency to the body of Example 1. It had a density of 6.06 g/cm$^3$ and a linear shrinkage of 25.3%. The linear shrinkage was higher than in Example 1 since the amount of binder added was larger.

EXAMPLE 3

To 100 parts by weight of zirconia powder having an average particle size of 0.33 μm as measured by the centrifugal sedimentation method, a specific surface area of 6.5 m$^2$/g as measured by the BET method, and a product of average particle size by specific surface area of 2.15 μm·m²/g (prepared by the method disclosed in U.S. Pat. No. 4,873,064) was added 16 parts by weight of the same organic binder as in Example 1. The mixture was milled in a pressure kneader at 130° C. for one hour, obtaining an injection molding composition. The composition was then injection molded into a test piece in a mold having a cavity with a length of 58 mm and a cross section of 5×4 mm, removed of the binder, and fired under the following conditions.

Molding conditions

Injection pressure: 790 kg/cm²
Injection speed: 3 cm/sec.
Mold temperature: 30° C.
Cylinder temperature: 140° C.

Binder removal conditions

Temperature range: 20° to 500° C.
Heating rate: 10°–40° C./hour
Binder removal time: 24 hours Firing conditions Air, 1450° C., 2 hours The resulting sintered body appeared white and had excellent surface smoothness, luster and transparency. It had a high density of 6.09 g/cm³ and a linear shrinkage of 20.7%. The test pieces were measured for flexural strength according to JIS R-1601, finding an average strength as high as 1100 MPa.

EXAMPLE 4

To 100 parts by weight of zirconia powder having an average particle size of 0.27 μm as measured by the centrifugal sedimentation method, a specific surface area of 9.2 m²/g as measured by the BET method, and a product of average particle size by specific surface area of 2.48 μm·m²/g (prepared by the method disclosed in Japanese Patent Application Kokai No. 185821/1988) was added 16 parts by weight of the same organic binder as in Example 1. The mixture was milled as in Example 3, obtaining an injection molding composition. The composition was then injection molded into a test piece in the same mold as in Example 3, removed of the binder, and fired under the same conditions as in Example 3 except for molding conditions.

Molding conditions

Injection pressure: 790 kg/cm²
Injection speed: 3 cm/sec.
Mold temperature: 30° C.
Cylinder temperature: 160° C.

The resulting sintered body appeared white and had excellent surface smoothness, luster and transparency. It had a high density of 6.09 g/cm³ and a linear shrinkage of 20.7%. The test pieces were measured for flexural strength according to JIS R-1601, finding an average strength as high as 1090 mPa.

COMPARATIVE EXAMPLE 4

Zirconia powder having an average particle size of 0.63 μm as measured by the centrifugal sedimentation method, a specific surface area of 5.5 m²/g as measured by the BET method, and a product of average particle size by specific surface area of 3.5 μm·m²/g was used. A molding composition was prepared by adding 16 parts by weight of the same organic binder as in Example 1 to 100 parts by weight of the zirconia powder and milling the mixture in a pressure kneader at 140° C. for two hours. The injection molding composition was pelletized, injection molded, removed of the binder, and fired under the same conditions as in Example 3.

The resulting sintered body appeared fairly brown and lacked transparency. It had a density of 5.96 g/cm³ and a linear shrinkage of 20.5%. The flexural strength of the test piece was measured as in Example 4, finding an average flexural strength of 550 MPa.

COMPARATIVE EXAMPLE 5

A sintered body was produced by repeating the procedure of Comparative Example 4 except that the binder removal time was 48 hours.

The sintered body appeared fairly brown and lacked transparency. It had a density of 6.00 g/cm³. The flexural strength of the test piece was measured as in Example 4, finding an average flexural strength of 1050 MPa.

EXAMPLE 5

To 100 parts by weight of the zirconia powder used in Example 4 was added the following binder.

| Binder ingredients | Parts by weight |
| --- | --- |
| Acrylic resin, BR 105 (Mitsubishi Rayon K.K.) | 5 |
| Ethylene-vinyl acetate copolymer, Ultracene 633 (Toso K.K.) | 4 |
| Paraffin wax (reagent grade) | 5 |
| Dibutyl phthalate (reagent grade) | 2 |

As in Example 4, the zirconia powder and binder were milled in a pressure kneader at 130° C. for one hour, obtaining an injection molding composition. The composition was injection molded as in Example 4, and removed of the binder and fired as in Example 3.

The resulting sintered body appeared white and had excellent surface smoothness, luster and transparency. It had a high density of 6.09 g/cm³ and a linear shrinkage of 20.5%. The test pieces were measured for flexural strength as in Example 4, finding an average flexural strength of 1085 MPa.

Although some preferred embodiments have been described, many modifications and variations may be made thereto in the light of the above teachings. It is therefore to be understood that within the scope of the appended claims, the invention may be practices otherwise than as specifically described.

We claim:

1. A method for preparing a zirconia sintered body comprising the steps of:
    injection molding a zirconia composition comprising 100 parts by weight of zirconia powder and 5 to 30 parts by weight of an organic binder, said zirconia powder containing 2 to 10 mol % of yttria in solid solution form and having a specific surface area of up to 12 m²/g as measured by the BET method and a product of an average particle size multiplied by the specific surface area of up to 3 μm·m²/g,
    removing the organic binder from the molded composition by heating, and
    firing the molded composition into a sintered body.
2. The method of claim 1, wherein the average particle size of said zirconia powder is 0.05 to 0.5 μm.
3. The method of claim 1, wherein the average particle size of said zirconia powder is 0.1 to 0.4 μm.

4. The method of claim 1, wherein the specific surface area of said zirconia powder is from 5 to 10 m²/g.

5. The method of claim 1, wherein the product of average particle size multiplied by the specific surface area of said zirconia powder is 1 to 2.5 μm·m²/g.

6. The method of claim 1, wherein said zirconia powder contains 2 to 8 mol % of yttria in solid solution form.

7. The method of claim 1, wherein the organic binder is selected from the group consisting of polyacrylic binders, wax binders, polyolefin binders, polyvinyl acetate binders and mixtures thereof.

8. The method of claim 1, wherein the organic binder in the zirconia composition is present in an amount of 10 to 20 parts by weight.

9. The method of claim 1, wherein the injection molding conditions include an injection pressure of 100 to 2,600 kg/cm², an injection speed of 0.1 to 10 cm/sec., a mold temperature of 10° to 70° C., a cylinder temperature of 100° to 180° C.

10. The method of claim 1, wherein the organic binder is removed by heating to about 500° C. at a rate of 5°-150° C./hour so as to remove the organic binder through pyrolysis.

11. The method of claim 10, wherein the heating rate if 10°-50° C./hour.

12. The method of claim 10, wherein the heating time for removing the organic binder is 5 to 100 hours.

13. The method of claim 10, wherein the heating time for removing the organic binder is 10 to 40 hours.

14. The method of claim 1, wherein the molded composition is fired into a sintered body at a temperature of 1,300° to 1,600° C.

15. The method of claim 1, wherein the molded composition is fired into a sintered body at a temperature of 1,350° to 1,500° C.

16. The method of claim 1, wherein the molded composition is fired into a sintered body for a period of 0.2 to 10 hours.

17. The method of claim 1, wherein the composition is fired into a sintered body for a period of 1 to 4 hours.

* * * * *